(12) United States Patent
Gray et al.

(10) Patent No.: US 6,275,712 B1
(45) Date of Patent: Aug. 14, 2001

(54) MOBILE STATION CONTROL STATES BASED ON AVAILABLE POWER

(75) Inventors: Steven D. Gray, Dallas; George Fry, Coppell, both of TX (US)

(73) Assignee: Nokia Mobile Phones Ltd, Espoo (FI)

( * ) Notice: Subject to any disclaimer, the term of this patent is extended or adjusted under 35 U.S.C. 154(b) by 0 days.

(21) Appl. No.: 09/259,080

(22) Filed: Feb. 26, 1999

(51) Int. Cl.$^7$ ...................................................... H04Q 7/20
(52) U.S. Cl. ............................. 455/522; 455/70; 455/574
(58) Field of Search ........................... 455/38.3, 70, 343, 455/522, 572, 573, 574; 370/318, 320, 311

(56) References Cited

U.S. PATENT DOCUMENTS

| | | | |
|---|---|---|---|
| 4,449,248 | * 5/1984 | Leslie et al. | 455/572 |
| 5,241,542 | * 8/1993 | Natrajan et al. | 455/38.3 |
| 5,794,137 | * 8/1998 | Harte | 455/343 |
| 5,870,685 | * 2/1999 | Flynn | 455/573 |
| 5,949,484 | * 9/1999 | Nakaya et al. | 455/574 X |
| 6,072,784 | * 6/2000 | Agrawal et al. | 455/522 X |

OTHER PUBLICATIONS

"A Battery Power Level Aware MAC Protocol for CDMA Wireless Networks," Shalinee Kishore, Et Al.

The cdma2000 ITU–R–RTT Candidate Submission (0.18), Telecommunications Industry Association, vol. 12, Jul. 27, 1998, pp. 117–139.

* cited by examiner

Primary Examiner—Nay Maung
(74) Attorney, Agent, or Firm—Brian T. Rivers

(57) ABSTRACT

A mobile station is transitioned between control states in a telecommunications system based on available power at the mobile station. In an embodiment, a mobile station signals the system to indicate that power available to the mobile station is less than or greater than a predetermined threshold and that timers for controlling transitions between packet data service control states are adjusted accordingly. If power is below the predetermined threshold, the time period durations of transition timers for control states that require higher mobile station power can be reduced. The mobile station will then spend less time in those control states, thereby conserving battery power.

16 Claims, 3 Drawing Sheets

MOBILE STATION CONTROL STATES BASED ON AVAILABLE POWER

FIELD OF THE INVENTION

This invention relates to mobile station control states and, more particularly, to a method and apparatus for transitioning a mobile station between packet data service control states based on available power at the mobile station.

BACKGROUND OF THE INVENTION

Major cellular system types include those operating according to the Global System for Mobile Communication (GSM) standard, the TIA/EIA/IS-95 Mobile Station-Base Station Compatibility Standard for Dual Mode Wide Band Spread Spectrum Cellular System (IS-95A), the TIA/EIA/IS-136 Mobile Station-Base Station Compatibility Standard (IS-136), and the TIA/EIA 553 Analog Standard (AMPS/TACS). Other major cellular systems include those operating in the personal communications system (PCS) band according to the ANSI-J-STD-008 1.8–2.0 GHz standard or those operating according to the GSM-based PCS 1900 (1900 MHz frequency range) standard. IS-95A is currently being updated as IS-95B in the document TIA/EIA-3693.

Currently, each of the major cellular system standards bodies is implementing data services into its digital cellular specifications. A packet data service specification has been finalized for GSM and IS-95A. Packet data service specifications compatible with the IS-136 and IS-95B standards are also being prepared.

A third-generation CDMA system is also being developed to provide more sophisticated and improved data services than provided by IS-95 and eventually to replace IS-95. In the proposed standard for third-generation CDMA, known as cdma2000 ITU-R RTT, it has been proposed that third-generation systems include packet data services that utilize one or more control states that a mobile station may be in when engaged in a data service. The control states are states in which a mobile station can have varying physical and logical channel configurations assigned to it, depending on the present data transmission situation. The third-generation CDMA control states are intended to be utilized when packet data services for particular mobile stations have varying quality of service (QoS) requirements.

For example, when no data has been transmitted for a certain period of time, a mobile station may transition from an active state, in which dedicated forward and reverse control and traffic channels are each maintained, to a control hold state in which only a dedicated forward control channel is maintained. The control hold state allows fast reassignment through the forward control channel and frees up system traffic channel resources. Again, after a certain period of time in the control hold state when no data has been transmitted, the mobile station may transition from the control hold state to a suspended state. In the suspended state, all dedicated channels are released and the mobile station monitors only the forward common control channel. From the suspended state, the mobile station may transition back to the control hold state if it is determined that data is to be transmitted within a certain period of time, or the mobile may transition to a null state if data is not to be transmitted within a certain period of time. Each of the control states requires the mobile station to expend a certain amount of power that depends on the type of channels assigned in that state and the time spent in that state. QoS requirements may be used to determine the time period for transitioning between control states and to determine which states are allowable for a mobile station. By defining the time periods and allowable states in a particular way, a mobile station may have faster access to channel resources and less delay in its packet application to satisfy certain QoS requirements while minimizing power consumption and freeing up system resources. While QoS requirements may be the major factor in determining the transition periods and allowable control states, basing the transition periods and allowable control states solely on QoS requirements may not be the most efficient way of controlling transitions between control states.

SUMMARY OF THE INVENTION

The present invention provides a method and apparatus for transitioning a mobile station between control states in a telecommunications system based on available power at the mobile station. The method and system allows a mobile station to signal the system to indicate that power available to the mobile station is less than or greater than a predetermined threshold and that parameters for controlling transitions between control states should be adjusted accordingly. For example, if a mobile station battery power falls below a predetermined threshold, the time periods for triggering transitions from selected control states that require greater mobile station power expenditure to maintain may be decreased, or the mobile station may be controlled to transition immediately from a current state to another state. The system may trade off packet service delay with mobile station power expenditure to prolong useful life of a battery in the mobile station. If the battery is charged and available power rises again above the predetermined threshold, the time periods for triggering transitions from the selected control states may be increased, or certain states prohibited in a low-power condition may become allowable again.

In an embodiment of the invention, the method and apparatus is implemented in a system having packet data service with states including an active state, a suspended state and a control hold state. The active state is associated with a timer Tactive, and the control hold state is associated with a timer Thold. The timer associated with each state is activated upon the termination of each data transmission and determines how long a mobile station will remain in that state if no data is transmitted or received within the time period duration for which the timer runs. According to the embodiment, a mobile station involved in transmitting and receiving data through the packet service transmits an indication to the system that the mobile station's battery power has fallen below or risen above a predetermined threshold level of full charge, for example, X%, in order to allow the system to modify the time period durations for Tactive and Thold. Tactive and Thold may be set to initial values used for a battery having full power.

Upon receiving the indication from the mobile station that battery power has fallen below X%, the system may then decrease the time period duration for the Tactive and Thold timers. As the mobile station is involved in the packet data service and data transmission ceases for periods of time, the mobile station will spend less time in the active and control hold states and more time in the suspended state. This preserves the remaining battery power.

If the mobile station has access to additional power during the packet data service, for example, the mobile station is plugged into a charger, the mobile station may transmit an indication to the system that the mobile station's battery power has risen again above the threshold level, X%. The system may then restore the time period duration for the Tactive and Thold timers to the initial settings.

DETAILED DESCRIPTION OF THE INVENTION

In an embodiment of the invention, the method and apparatus may be implemented into a cellular system that operates according to the Code Division Multiple Access (CDMA) cellular system standard specified in the document, "The cdma2000 ITU-R RTT Candidate Submission (0.18)," published by the Telecommunications Industry Association, TR-45.5 Subcommittee, Jul. 27, 1998 (cdma2000). The packet data services of the system are modified by the implementation of the method and apparatus for transitioning a mobile station between active, control hold and suspended packet data service control states based on available power according to the embodiment of the invention. The method and apparatus of the invention also has application to all types of telecommunication systems that may use similar packet data services, such as, for example, time division multiple access (TDMA) systems.

Figure 1:
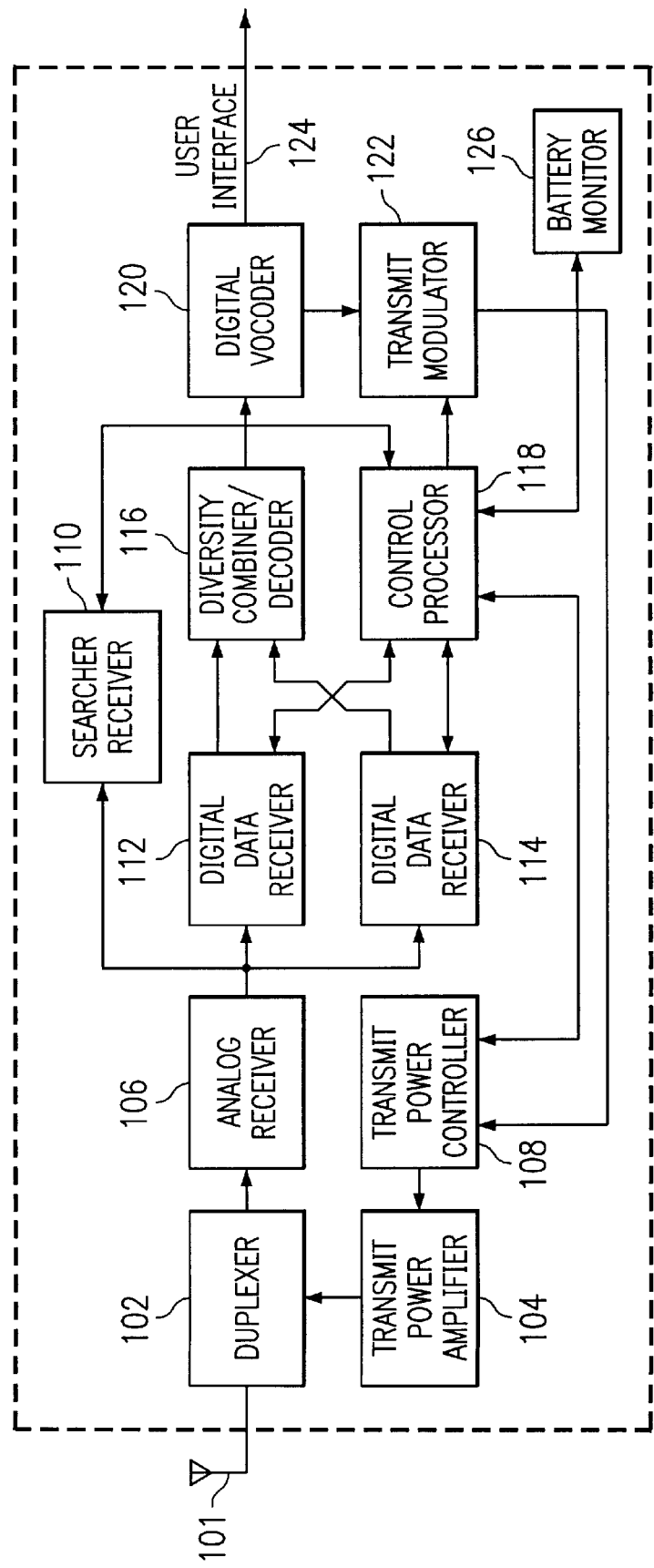
FIG. 1 is a block diagram of portions of a mobile station according to an embodiment of the invention.

Referring now to FIG. 1, therein is a block diagram of portions of a mobile station 100 of the embodiment of the invention. Mobile station 100 comprises antenna 101, duplexer 102, transmit power amplifier 104, analog receiver 106, transmit power controller 108, searcher receiver 110, digital data receiver 112, digital data receiver 114, diversity combiner/decoder 116, control processor 118, digital vocoder 120, transmit modulator 122, user interface 124, and battery monitor 126. Mobile station 100 may be implemented as any type of terminal having data capability, such as a mobile phone attached to a laptop, a communication type device, or a laptop having built-in transceiving capability.

Antenna 101 is coupled to analog receiver 106 through duplexer 102. Signals received at antenna 101 are input to analog receiver 106 through duplexer 102. The received signals are then converted to baseband frequency and then filtered and digitized in analog receiver 106 for input to digital data receiver 112, digital data receiver 114 and searcher receiver 110. The digitized baseband signal input to digital data receiver 112, digital data receiver, 114 and searcher receiver 110 may include signals from ongoing calls, including control information and data transmitted on the forward common control channel (F-CCCH), together with the pilot carriers transmitted by the base station of the cell site in which the mobile station is currently located, plus the pilot carriers transmitted by the base stations in all neighboring cell sites. Digital data receiver 112 and digital data receiver 114 perform correlation on the baseband signal with a pseudo random noise (PN) sequence of a desired received signal. The output of digital data receivers 112 and 114 is a sequence of encoded data signals from two independent paths. Searcher receiver 110 scans the time domain around the nominal time of a received pilot signal of a base station for other multi-path pilot signals from the same base station and for other signals transmitted from different base stations. Searcher receiver 110 measures the strength of any desired waveform at times other than the nominal time. Searcher receiver 110 generates signals to control processor 118 indicating the strengths of the measured signals to control processor 118.

The encoded data signals output from digital data receiver 112 and digital data receiver 114 are input to diversity combiner/decoder 116. In diversity combiner/decoder 116 the encoded data signals are aligned and combined, and the resultant data signal is then decoded using error correction and input to digital vocoder 120. Digital vocoder 120 then outputs information signals to the user interface 124. User interface 124 may be a handset with a keypad or another type of user interface, such as a laptop computer monitor and keyboard.

For transmission of signals from mobile station 100, a signal received at user interface 124 is input to digital vocoder 120 in digital form as, for example, data or voice that has been converted to digital form at user interface 124. In digital vocoder 120 the signal is encoded and output to transmit modulator 122. Transmit modulator 122 Walsh encodes the signal and then modulates the Walsh encoded signal onto a PN carrier signal, with the PN carrier sequence being the PN carrier sequence of the CDMA channel to which the mobile station is assigned. The PN carrier information is transmitted to mobile station 100 from the system and transferred to control processor 118 from digital data receivers 112 and 114 after being received from the system. Control processor 118 sends the PN carrier information to transmit modulator 122. The PN modulated signal is then output from transmit modulator 122 to transmit power controller 108. Transmit power controller 108 sets the level of the transmission power of mobile station 100 according to commands received from control processor 118. The modulated signal is then output from transmit power controller 108 to transmit power amplifier 104 where the signal is amplified and converted to an RF signal. The RF signal is then output from transmit power amplifier 104 to duplexer 102 and transmitted from antenna 101.

According to the embodiment of the invention, battery monitor 126 monitors mobile station battery power level and sends an indication to control processor 118 at an appropriate time. For example, battery monitor 126 may send a signal to control processor 118 indicating that battery power level has fallen below a predetermined threshold level of full charge, X%, and may also send a signal to control processor 118 indicating that the battery power level has risen above X%.

The predetermined threshold level X% may be set through a user interface menu function that allows a user to set the threshold. The menu function could allow a simple implementation, for example, the function could allow the user to use a yes/no activation of the packet data service power-saving function with a previously-set or default threshold level, or it could allow a user to choose a particular value for the threshold when activating the packet data service power-saving function. Alternatively, the predetermined threshold level could be activated and set by the system operator to a value received from base station 200 in a control message. The setting of threshold levels within battery monitor 126 may be controlled by control processor 118 according to the desired value. Control processor 118 includes appropriate software and/or hardware, including memory for storing control programs, that receives a signal from battery monitor 126 and generates a signal to the system according to the embodiment of the invention.

Figure 2:
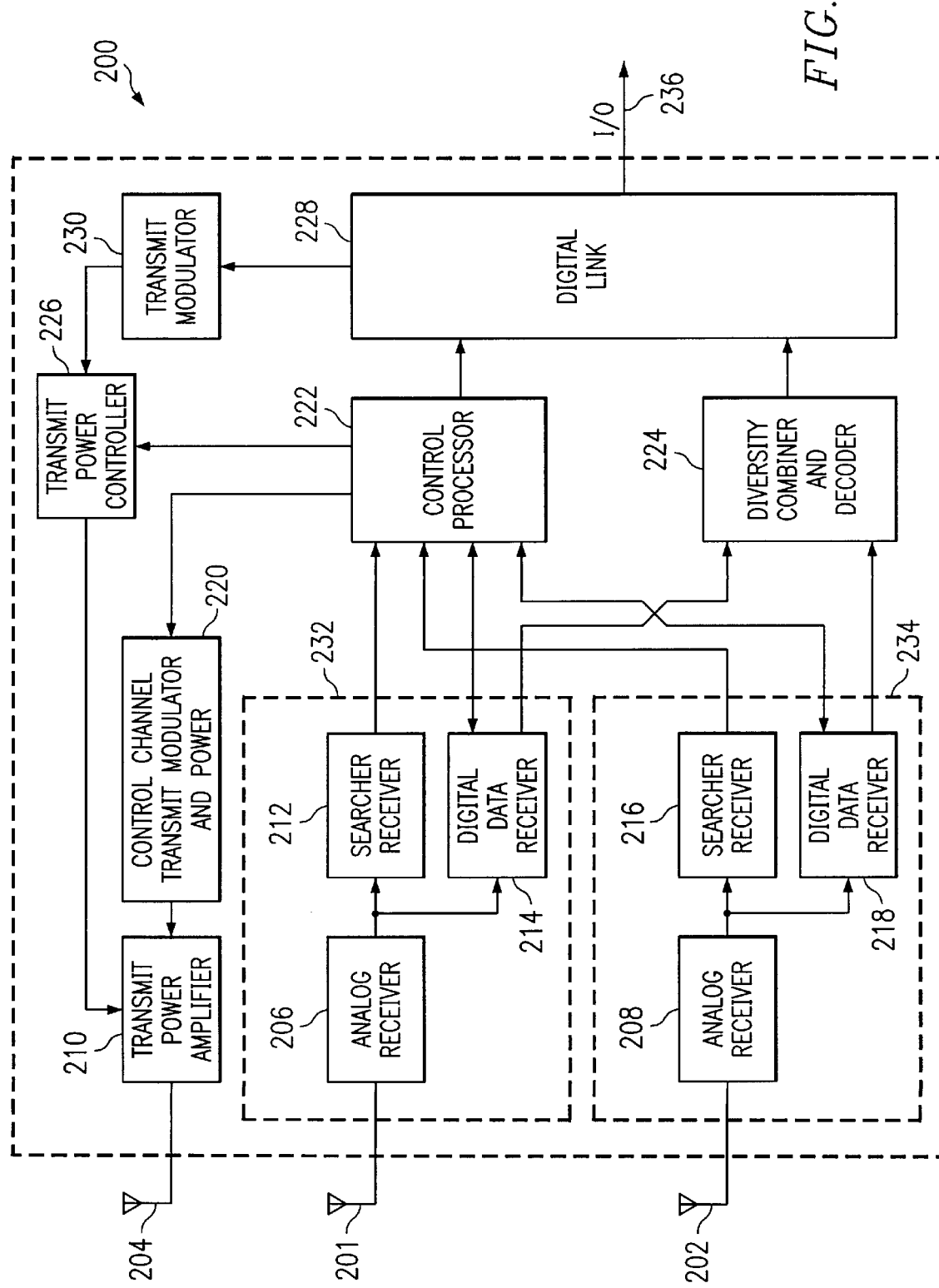
FIG. 2 is a bock diagram of portions of a base station according to an embodiment of the invention.

Referring now to FIG. 2, therein is a block diagram of portions of a base station 200 according to an embodiment of the invention. Base station 200 includes a first receiver section 232, a second receiver section 234, control processor 222, diversity combiner/decoder 224, transmit power controller 226, digital link 228, input/output I/O 236, transmit modulator 230, control channel transmitter/modulator 220, transmit power amplifier 210, and antenna 201. First receiver section 232 comprises antenna 201, analog receiver 206, searcher receiver 212 and digital data receiver 214. Second receiver section 234 comprises antenna 202, analog receiver 208, searcher receiver 216 and digital data receiver 218.

First receiver section 232 and second receiver section 234 provide space diversity for a single signal that may be received at both antennas 201 and 202. The signals received at antenna 201 are input to analog receiver 206 where the signal is filtered, converted to baseband frequency and digitized to generate a digital signal. The digital signal is then output from analog receiver 206 to searcher receiver 212 and digital data receiver 214. Searcher receiver 212 scans the time domain around the received signal to verify that digital data receiver 214 tracks the correct signal. Control processor 222 generates the control signals for digital data receiver 214 according to a signal received from the searcher receiver 212, so that the correct signal is received at digital data receiver 214. Digital data receiver 214 generates the proper PN sequence necessary to decode the digital signal received from analog receiver 206 and generates weighted output symbols for input to diversity combiner/decoder 224. Antenna 202, analog receiver 208, searcher receiver 216 and digital data receiver 218 of second receiver section 234 function identically to the components of first receiver section 232 to generate a second set of weighted output symbols. The weighted symbols from digital data receiver 214 and digital data receiver 218 are then combined and decoded in diversity combiner/decoder 224 to generate received digital data which is then output through digital link 228 and I/O 236 to the system.

When data received from the system is to be transmitted from base station 200 on a traffic channel, the data is received at digital link 228 over I/O 236 and sent to transmit modulator 230. Transmit modulator 230 then modulates the data using the appropriate Walsh function assigned to the mobile station to which the base station is transmitting. The Walsh modulated data is then spread by a channel PN sequence having the appropriate time shift and input to transmit power controller 226. Control information and data are also transmitted by base station 200 on the appropriate control channels to mobile stations. Transmit power controller 226 controls the transmission power of base station 200 in response to control signals received from control processor 222. Base station 200 also controls packet data services and packet data service control states by transmitting control information on the appropriate control channels. Base station 200 generates packet data service control information and signals as triggered by the Tactive and Thold timers of the active and control hold states, respectively, to transition mobile station 100 between the packet data service control states. The power control commands may be generated by software in control processor 222. The signal output from transmit power controller 226 is input to transmit power amplifier 210 and then transmitted from antenna 204. Base station 200 may have multiple transmit modulators and transmit power controllers for transmitting to multiple mobile stations.

According to the embodiment of the invention, control processor 222 includes software and/or hardware, including memory for storing control programs, that receives data included in a signal transmitted from mobile station 100 indicating that mobile station battery power has fallen below or risen above the threshold X%. According to the data received, control processor 222 will modify Tactive and Thold timer period durations and generate the appropriate commands.

Figure 3:
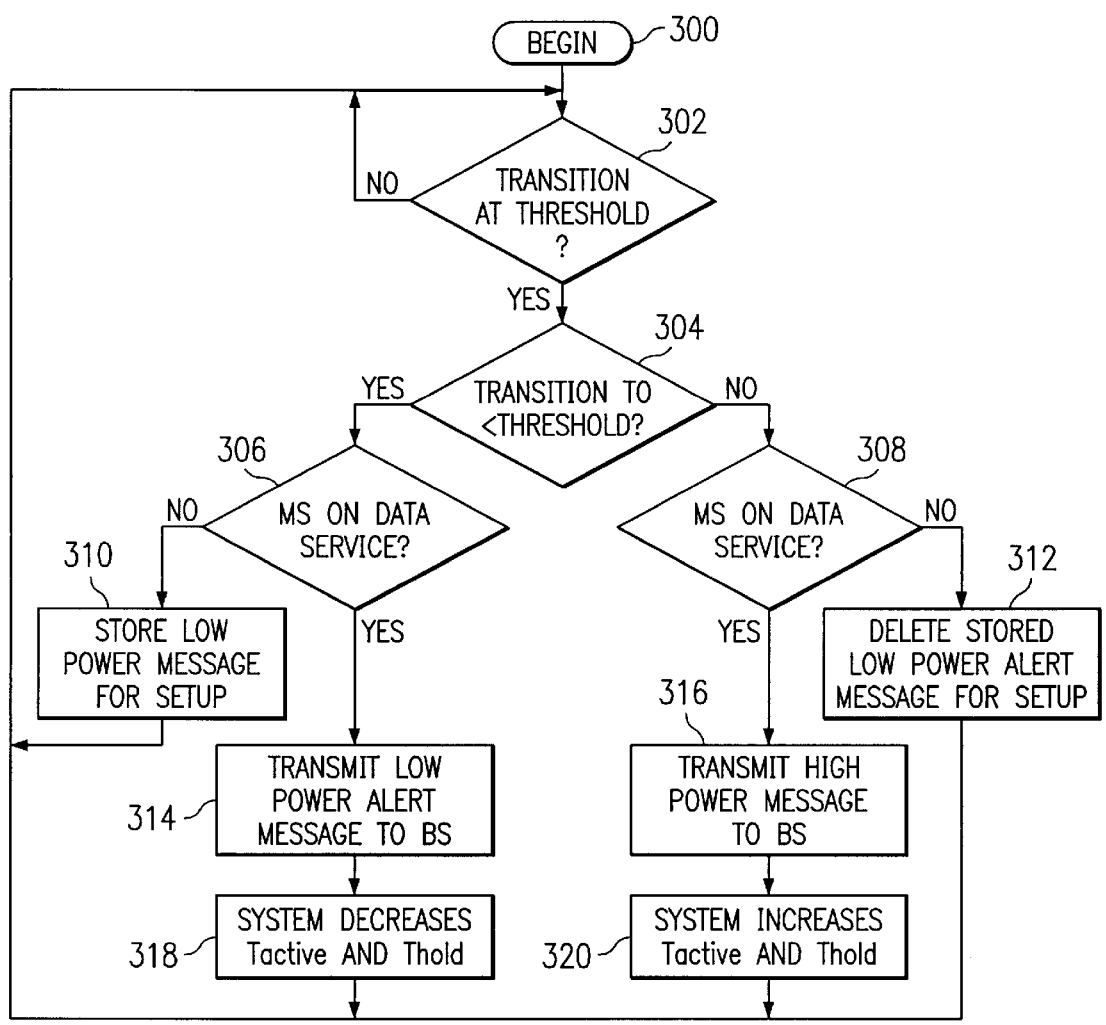
FIG. 3 is a flow diagram illustrating process steps performed for transitioning a mobile station between packet data control states according to an embodiment of the invention.

Referring now to FIG. 3, therein is a flow diagram illustrating process steps performed for transitioning a mobile system between packet data service control states according to an embodiment of the invention. The process steps of FIG. 3 are performed under the control of control processor 118 of mobile station 100 and control processor 222 of base station 200 according to software and/or hardware configured according to the embodiment of the invention.

The process begins at step 300. The process may either be automatically activated upon power-up of mobile station 100 or upon the entry of mobile station 100 into a system providing the method and apparatus of the invention. Alternatively, the process may be activated by a user menu function during a time when the mobile station is powered on. When the process is activated, battery monitor 126 monitors the battery power of mobile station 100 at step 302. If no battery power transition below or above the threshold level is detected, the process will remain at step 302. If a transition of the available battery power below or above the threshold is detected by battery monitor 126, battery monitor 126 sends a signal to control processor 118 indicating the transition.

Next, at step 304, control processor 118 determines if the transition was a transition to less than the threshold. If, at step 304, it is determined that the transition was a transition to less than the threshold, the process moves to step 306. At step 306, control processor 118 determines if mobile station 100 is currently active on a packet data service. If mobile station 100 is not currently active on a packet data service, the process moves to step 310. At step 310, control processor 118 formats and stores a low-power alert message to be transmitted to the system upon setup of a data service. The low-power alert message will allow the system to set Tactive and Thold to power-conserving values when a packet data service is activated. The process then returns to step 302, where battery monitor 126 monitors the battery of mobile station 100 for a transition to above the threshold level. If, however, at step 306 it is determined that mobile station 100 is currently active on a packet data service, the process moves to step 314. At step 314, control processor 118 initiates transmission of a low-power alert message to the base station with which it is currently communicating, such as base station 200. The low-power alert message may be transmitted by mobile station 100 on the cdma2000 reverse dedicated medium access control channel (r-dmch). An r-dmch is assigned to a mobile station when the mobile station is in the active or control hold states. As an alternative, the reverse dedicated traffic channel (r-dtch) may also be used to transmit the low-power alert message while in the active state. Next, at step 318, the system decreases Tactive and Thold to power-conserving values. Mobile station 100 will now transition more quickly from the active and control hold states to the suspended states, conserving battery power. The process then returns to step 302, where battery monitor 126 monitors the battery of mobile station 100 for a transition to above the threshold level.

If, however, at step 304, control processor 118 determines that the transition detected at step 302 was a transition to greater than the threshold, the process moves to step 308. At step 308, control processor 118 determines if mobile station 100 is currently active on a packet data service. If mobile station 100 is not currently active on a packet data service, the process moves to step 312. At step 312, control processor 118 deletes any low-power alert message that has been stored for transmission to the system upon setup of a data service. Deletion of any stored low-power alert message will cause the system to activate a packet data service with Tactive and Thold set to initial (high power) values. If, however, at step 308, it is determined that mobile station 100 is currently active on a packet data service, the process moves to step 316. At step 316, control processor 118 initiates transmission of a high-power alert message to the base station with which it is communicating, such as base station 200. The high-power alert message may be transmitted by mobile station 100 on r-dmch when the mobile station is in the active or control hold states. Alternatively, the r-dtch may also be used to transmit the high-power alert message while in the active state. Next, at step 320, the system increases Tactive and Thold to the initial (high power) values. Mobile station 100 will now transition more slowly from the active and control hold states to the suspended state than when Tactive and Thold are set to low-power values. Mobile station 100 will now spend more time in the active and control hold states providing a better quality of service (QoS) for the data service through quicker return times to the active state, since return to the active state is quicker from the control hold state than from the suspended state. The process then returns to step 302, where battery monitor 126 monitors the battery of mobile station 100 for a transition to below the threshold level.

In an alternative embodiment, when battery monitor 126 detects that the mobile station battery power has fallen below the threshold X%, one or more intermediate control states may be prohibited to the mobile station. In this embodiment, a mobile station operating in the control hold state and detecting a low-power condition would transmit a low-power indication signal requesting an immediate state change to the suspended state from the base station. The base station then would transmit a control message to the mobile station forcing a change of state to the suspended state.

It will be apparent to those skilled in the art that various alternative embodiments of the invention are possible. For example, while a single threshold level has been described in the disclosed embodiments, it is possible to implement the invention using more than one threshold level and having more than two possible values for the time period durations for triggering transitions between control states, with the time period durations successively set to lower values for each threshold level the battery power falls below. Also the time period duration for triggering transitions between control states could be set in opposite directions, for example, upon determining that mobile station battery power has fallen below a threshold, an active state timer value could be decreased while a control hold state timer could be increased to provide lower power consumption without degrading quality of service as severely as decreasing both timer values.

Thus, although the method and apparatus of the invention has been illustrated and described with regard to presently preferred embodiments thereof, it will be understood that numerous modifications and substitutions may be made to the embodiments described and that numerous other embodiments of the invention may be implemented without departing from the spirit and scope of the invention as defined in the following claims.

What is claimed is:

1. In a telecommunications system, a method of transitioning a mobile station between control states, said method comprising the steps of:

determining available power for the mobile station; and setting at least a first and a second parameter based on the result of said step of determining and a selected trade-off of service delay with mobile station power expenditure, said first and said second parameters defining a first and second transition time, respectively, each defining a duration of time the mobile station will remain in a first and a second control state, respectively, wherein the mobile station moves from said first control state to said second control state upon a detection of inactivity in said first control state for said duration of time defined by said first parameter and to a third control state upon a detection of inactivity in said second control state for said duration of time defined by said second parameter, and wherein mobile station power necessary to remain in each state decreases from said first control state and said second control state to said third control state.

2. The method of claim 1, wherein said step of setting at least a first and a second parameter comprises setting said second parameter to define a duration of time during which the mobile station will remain in a control hold state before releasing dedicated control channels, if no data is to be transmitted within said duration of time defined by said second parameter.

3. The method of claim 1, wherein said step of setting at least a first and a second parameter comprises setting said first parameter to define a duration of time during which the mobile station will remain in an active state before releasing traffic channels, if no data is to be transmitted within said duration of time defined by said first parameter.

4. The method of claim 1, wherein said step of determining available power for the mobile station comprises the steps of:

measuring available battery power in the mobile station; and transmitting a message to the system, said message including an indication of said available battery power.

5. The method of claim 4, wherein said step of transmitting includes transmitting a message including an indication that said available battery power is below a predetermined threshold, and wherein said step of setting at least a first and a second parameter comprises reducing the value of said first and second parameter defining said first and second transition time between said first and second control states, respectively.

6. The method of claim 4, wherein said step of transmitting includes transmitting a message including an indication that said available battery power is above a predetermined threshold, and wherein said step of setting at least a first and a second parameter comprises increasing the value of said first and second parameter defining said first and second transition time between said first and second control states, respectively.

7. The method of claim 1, wherein said step of setting at least a first and a second parameter comprises prohibiting mobile station operation in a selected control state.

8. The method of claim 1, wherein said step of setting comprises sending a message to the mobile station forcing a change of control state.

9. The method of claim 1, wherein said step of determining available power for the mobile station comprises the steps of:

determining available battery power in the mobile station; and transmitting a message to the system, said message requesting a change of control state; and wherein said step of setting comprises transmitting a message to the mobile station forcing a change of control state.

10. In a telecommunications systems, an apparatus for transitioning a mobile station between control states, said apparatus comprising:

a monitor in the mobile station, said monitor for monitoring available battery power and generating a first signal in response to said available battery power reaching a predetermined level;

a first processor coupled to said monitor, said first processor for receiving said first signal and initiating transmission of a message from the mobile station on an RF channel;

a receiver for receiving said message on said RF channel and generating a second signal, said second signal including data, said data including information from said message transmitted from the mobile station; and a second processor coupled to said receiver, said second processor for receiving said second signal and setting at least a first and a second parameter based on said data included in said second signal and a selected trade-off of service delay with mobile station power expenditure, said first and said second parameter defining first and second transition times, respectively, defining a duration of time the mobile station will remain in a first or a second control state, respectively, wherein the mobile station moves from said first control state to said second control state upon detection of inactivity in said first control state for said duration of time defined by said first parameter and to a third control state upon a detection of inactivity in said second control state for said duration of time defined by said second parameter, and wherein mobile station power necessary to remain in each state decreases from said first control state and said second control state to said third control state, said second processor further for generating at least a third signal for controlling mobile station control state transitions based on said first and second parameter.

11. The apparatus of claim 10, wherein said second transition time defines a duration of time during which the mobile station will remain in a control hold state before releasing dedicated control channels, if no data is to be transmitted within said second duration of time.

12. The apparatus of claim 10, wherein said first transition time defines a duration of time during which the mobile station will remain in an active state before releasing traffic channels, if no data is to be transmitted within said first duration of time.

13. The apparatus of claim 10, wherein said data included in said message transmitted from said mobile station includes an indication that said available battery power is below a predetermined threshold, and wherein said second processor sets said first and second parameter by reducing the value of said first and second parameter defining said transition time between said first and second control states, respectively.

14. The apparatus of claim 10, wherein said data included in said message transmitted from said mobile station includes an indication that said available battery power is above a predetermined threshold, and wherein said second processor sets said first and second parameter by increasing the value of said first and second parameter defining said transition time between said first and second control states, respectively.

15. The apparatus of claim 10, wherein said second processor sets said at least a first and a second parameter by prohibiting mobile station operation in a selected control state.

16. The apparatus of claim 10, wherein said second processor generates said at least a third signal for forcing a change of control state at the mobile station.

* * * * *